United States Patent [19]

Hamada et al.

[11] Patent Number: 4,467,673
[45] Date of Patent: Aug. 28, 1984

[54] CONTROL SYSTEM FOR ENGINE OF AUTOMOTIVE VEHICLE EQUIPPED WITH LOCK-UP TYPE AUTOMATIC TRANSMISSION

[75] Inventors: Hideo Hamada; Yoshiro Morimoto, both of Yokosuka; Masaaki Suga, Yokohama; Masaaki Futagi; Tadashi Suzuki, both of Yokosuka, all of Japan

[73] Assignee: Nissan Motor Company, Limited, Yokohama, Japan

[21] Appl. No.: 268,323

[22] Filed: May 29, 1981

[30] Foreign Application Priority Data

Jun. 2, 1980 [JP] Japan .................................. 55-726672

[51] Int. Cl.$^3$ .............................................. B60K 41/02
[52] U.S. Cl. ......................................... 74/860; 74/856; 74/859; 192/0.096; 123/571
[58] Field of Search ...................... 74/752 D, 856, 861, 74/863, 864, 866, 859, 860; 192/0.096, 3.31, 3.58; 123/571, 625, 407

[56] References Cited

U.S. PATENT DOCUMENTS

| | | | |
|---|---|---|---|
| 2,856,794 | 10/1958 | Simpson | 74/732 |
| 3,584,521 | 6/1971 | Tooker et al. | 74/856 |
| 3,710,652 | 1/1973 | Miyazaki | 74/864 |
| 4,073,202 | 2/1978 | Aoyama et al. | 74/856 |
| 4,120,214 | 10/1978 | Toda et al. | 123/571 |
| 4,191,143 | 3/1980 | Yuuki | 123/407 |
| 4,191,147 | 3/1980 | Yuuki | 123/407 |
| 4,193,381 | 3/1980 | Aoyama | 123/407 |
| 4,220,126 | 9/1980 | Tomita et al. | 123/407 |
| 4,257,381 | 3/1981 | Yuzawa et al. | 74/856 |
| 4,294,140 | 10/1981 | Iwanaga et al. | 192/3.31 |

Primary Examiner—Allan D. Herrmann
Assistant Examiner—Joseph M. Rolnicki
Attorney, Agent, or Firm—Schwartz, Jeffery, Schwaab, Mack, Blumenthal & Koch

[57] ABSTRACT

A control system for an engine of an automotive vehicle equipped with a lock-up type automatic transmission. The engine control system comprises a gear ratio determinating circuit and a vehicle speed detector for determining whether the automotive vehicle is operating in a predetermined lock-up range or not and a logic circuit for generating a lock-up signal that indicates that the automotive vehicle is operating within said predetermined lock-up range, whereupon exhaust gas recirculation and ignition timing are varied from their ordinary patterns to a pattern suitable for operation of the engine with the torque converter operating in a lock-up state.

10 Claims, 13 Drawing Figures

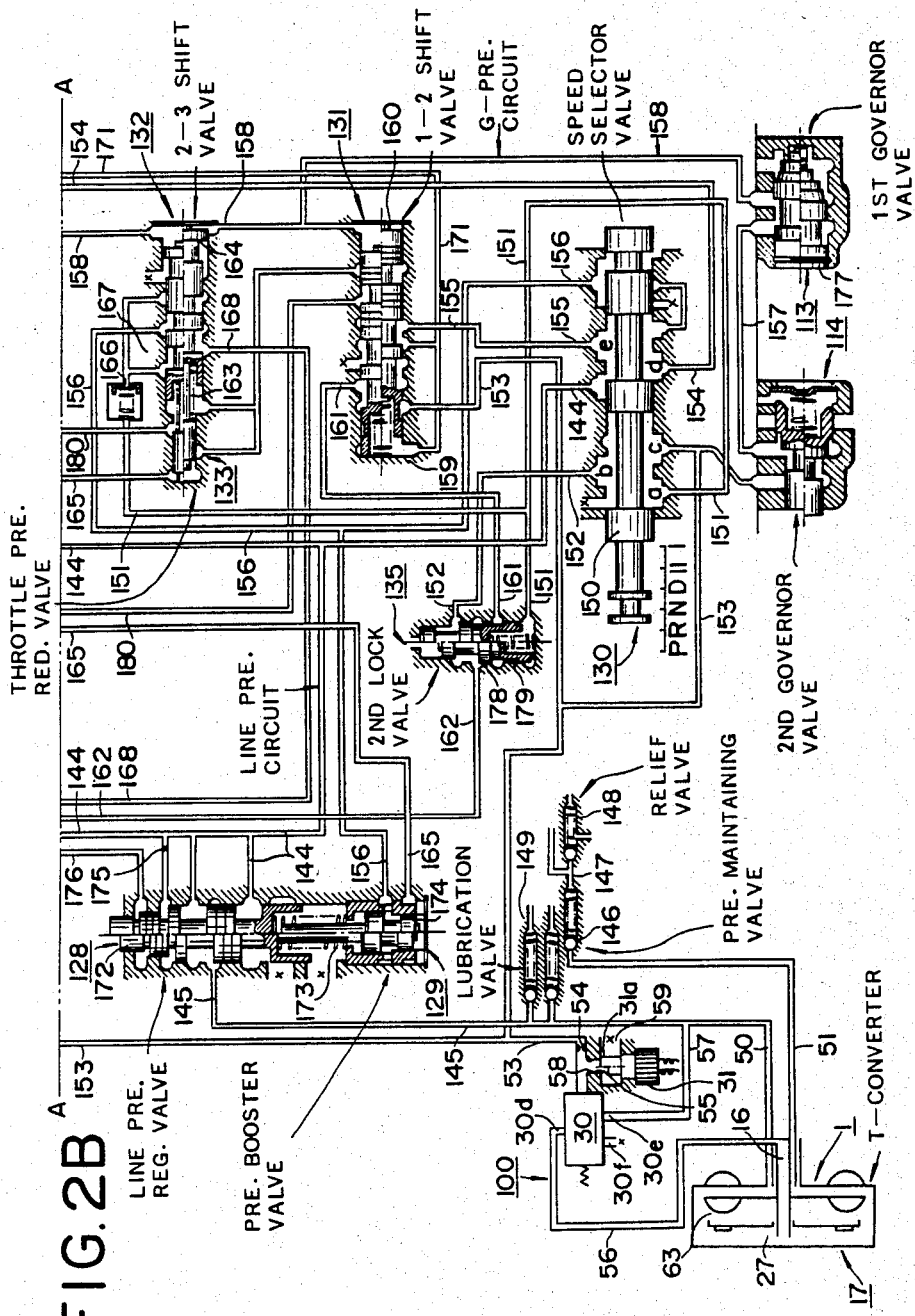

CONTROL SYSTEM FOR ENGINE OF AUTOMOTIVE VEHICLE EQUIPPED WITH LOCK-UP TYPE AUTOMATIC TRANSMISSION

BACKGROUND OF THE INVENTION

1. Field of the Invention

The present invention relates to a control system for an engine of an automotive vehicle equipped with a lock-up type automatic transmission, and more particularly to a control system for exhaust gas recirculation and ignition timing of the engine.

2. Description of the Prior Art

Most automatic transmissions include a torque converter in their power transmission system thereof so as to increase the torque fed to the transmission from an engine. Most torque converters are of the type wherein a pump impeller driven by the engine causes the rotation of operating oil within the torque converter so as to rotate a turbine runner under the reaction of a stator to thereby increase the torque (torque-converter state). During the operation of the torque converter, a certain amount of slip between the pump impeller and turbine runner is unavoidable. Thus the automatic transmission which include such a torque converter in that power transmission system have an advantage in that they are easy to operate, but suffer a drawback in that the power transmission effeciency is poor, resulting in poor fuel economy. To alleviate this drawback, torque converters have been proposed torque having a direct clutch (also called a lock-up torque converter) wherein during relatively high ranges of vehicle speed operation where torque variation of an associated engine do not create a problem, the turbine runner is directly connected to the pump impeller (lock-up state) to eliminate any slip therebetween. Recently some vehicles have used a lock-up type automatic transmission including a torque converter of this kind in its power transmission system.

Since a vehicle equipped with an ordinary automatic transmission has a torque converter in its power transmission system that is subjected to a slip, as described before, relatively high engine speeds are required to obtain the same running state as compared to the vehicle equipped with a manual transmission having no such slip. Therefore, it is a common practice to increase the exhaust gas recirculation and to advance the ignition timing of engines having such automatic transmissions in comparison to vehicles equipped with a manual transmission, for the purpose of exhaust gas purification. The exhaust gas recirculation and the ignition timing settings of lock-up type automatic transmissions are similarly increased and advanced respectively.

However, if the exhaust gas recirculation setting is so increased and the ignition timing setting are so advanced, it may cause unstable combustion when the automatic transmission operates in the lock-up state, where power transmission operation is similar to the manual transmission operation, thus causing surging during crusing operation. Moreover, where the ignition timing is advanced too much under such operating conditions, it may cause knocking. The result is a failure to satisfactorily accomplish the intended object of lock-up type of the automatic transmissions, viz., enhancement of fuel economy.

SUMMARY OF THE INVENTION

A primary object of the present invention is to provide a control system for an engine of an automotive vehicle with a lock-up type automatic transmission which solves the above-mentioned problem.

According to the present invention, a control system is provided which comprises a means for determining whether the automotive vehicle is operating in a predetermined lock-up range or not and for generating a lock-up signal that indicates that the automotive vehicle is operating within said predetermined lock-up range. An exhaust gas recirculation control means is provided which is responsive to the absence of said lock-up signal for varying the amount of exhaust gas recirculation in a first pattern which provides suitable exhaust gas recirculation for operation of the engine when the lock-up torque converter operates in the torque converter state, and responsive to the presence of said lock-up signal for varying the amount of exhaust gas recirculation in a second pattern which provides suitable exhaust gas recirculation for operation of the engine when the lock-up torque converter operates in the lock-up state. The control system also comprises ignition timing control means responsive to the absence of said lock-up signal for varying a spark timing in a first pattern which provides suitable spark timing for operation of the engine when the torque converter operates in the torque converter state, and responsive to the presence of said lock-up signal for varying a spark timing in a second pattern which provides suitable spark timing for operation of the engine when the torque converter operates in the lock-up state.

BRIEF DESCRIPTION OF THE DRAWINGS

The invention will be more apparent from the following description and drawings, in which:

FIGS. 2A and 2B, when combined, provide a schematic view of a hydraulic control portion of the lock-up type automatic transmission;

DESCRIPTION OF THE PREFERRED EMBODIMENT

Figure 1:
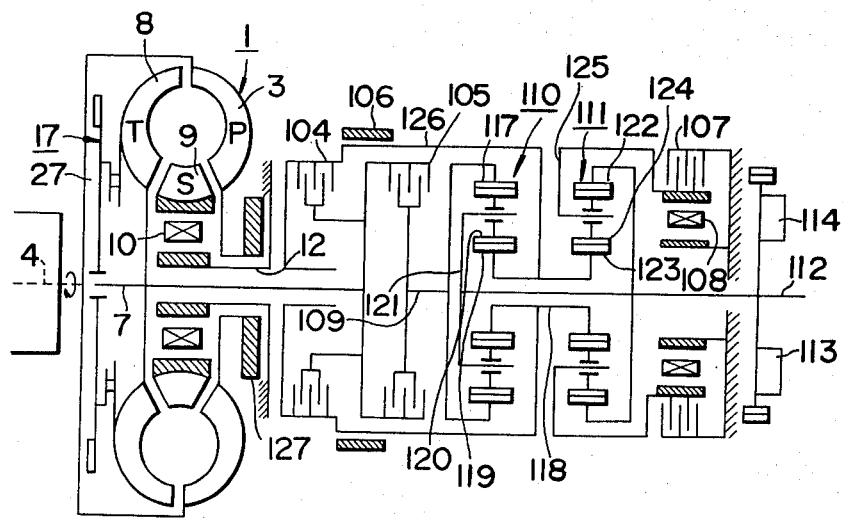
FIG. 1 is a schematic view of a planetary gearing portion of a lock-up automatic transmission.

Referring to the drawings and particularly to FIG. 1, there are shown a crankshaft 4 driven by a prime mover such as an engine, a torque converter 1 having a lock-up clutch 17 which is further described below, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller 3, a turbine runner 8, and a stator 9, in which the pump impeller 3 is driven by the crankshaft 4 to circulate the torque converter operation oil therein so as to transmit torque to the turbine runner 8 fixed on the input shaft 7. The torque is further transmitted by the input shaft 7 to a change-speed planetary gearing. The stator 9 is disposed on a sleeve 12 through a one-way clutch 10, the one-way clutch allowing the stator 9 to rotate in the same direction as the crankshaft 4, that is, in the direction indicated by an arrow to FIG. 1 (this rotation is referred to as forward rotation hereinafter), but not allowing it to rotate in the reverse direction (this rotation is referred to as reverse rotation hereinafter). The first planetary gear unit 110 comprises an internally toothed gear 117 fixed on the intermediate shaft 109, a sun gear 119 fixed on a hollow transmitting shaft 118, and more than one planetary pinions 120 capable of performing rotation and revolution simultaneously while meshing with the internally toothed gear 117 and sun gear 119 respectively, and a planetary pinion carrier 121 for supporting the planetary pinions 120 fixed on an output shaft 112, wherein the second planetary gear unit 111 comprises an internally toothed gear 122 fixed on the output shaft 112, a sun gear 123 fixed on the hollow transmitting shaft 118, and more than one planetary pinions 124 capable of performing rotation and revolution while meshing with the internally toothed gear 122 and sun gear 123 respectively, and a planetary pinion carrier 125 for supporting the planetary pinions 124. The front clutch 104 is operative to connect the input shaft 7 to be driven by the turbine runner 8 to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 126 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

The power flow paths established when a manual speed selector rod is set in a D position (forward drive range) will now be explained.

In this position only the rear clutch 105, a forward clutch, is engaged. The power output of the engine, via the torque converter 1, is transmitted by the input shaft 7 and rear clutch 105 to the internally toothed gear 117 of the first planetary gear unit 110. This rotation of the internally toothed gear 117 causes the planetary gears 120 to rotate forwardly. Accordingly, the sun gear 119 rotates reversely. Since the sun gear 123 of the second planetary gear unit 111, which is rotatable with the sun gear 119 also rotates reversely, the planetary gears 124 of the second planetary gear unit 111 rotate forwardly. The one-way brake 108 acts as a forward reaction brake to prevent the pinion carrier 125 from being rotated reversely by the sun gear 123, thus causing forward rotation of the internally toothed gear 122 of the second planetary gear unit 111. Accordingly, the output shaft 112, which is rotatable with the internally toothed gear 122, rotates forwardly, thereby establishing the first forward gear ratio.

If, in this state, the vehicle speed increases enough to cause the application of the second brake 106, the power flow path through the input shaft 7 and rear clutch 105 up to the internally toothed gear 117 is the same as that for the first forward speed. The second brake 106 acts as a forward reaction brake to anchor the drum 126 for preventing rotation of the sun gear 119. This causes the planetary pinions 120 to rotate, revolving simultaneously around the anchored sun gear 119. Accordingly the planetary pinion carrier 121 and output shaft 112, which is rotatable with the pinion carrier 121, rotate at a faster speed than in the case of the first speed although with a certain reduction ratio, thereby establishing the second forward ratio.

If the vehicle speed further increases so as to cause the second brake 106 to be released, and therefore the front clutch 104 to be engaged, the power on the input shaft 7 is transmitted partially through the rear clutch 105 to the internally toothed gear 117. The remainder of the power is transmitted through the front clutch 104 to the sun gear 119. Thus, the internally toothed gear 117 and sun gear 119 are interlocked and rotate forwardly, as a unit, together with both the pinion carrier 121 and output shaft 112 at the same rotational speed, thereby establishing the third forward gear ratio. In this case, the input power is fed to both the front clutch 104 and rear clutch 105 and the torque increase is not carried out by the planetary gears so that none act as a reaction brake in this state.

The planetary gearing arrangement illustrated in and described in connection with FIG. 1 is similar in construction to the planetary gearing arrangmenet disclosed in U.S. Pat. No. 2,856,794 issued to H. W. Simpson, on Oct. 21, 1958, and reference thereto may be made for a more complete description of the construction and operation of the transmission.

Figure 2A:
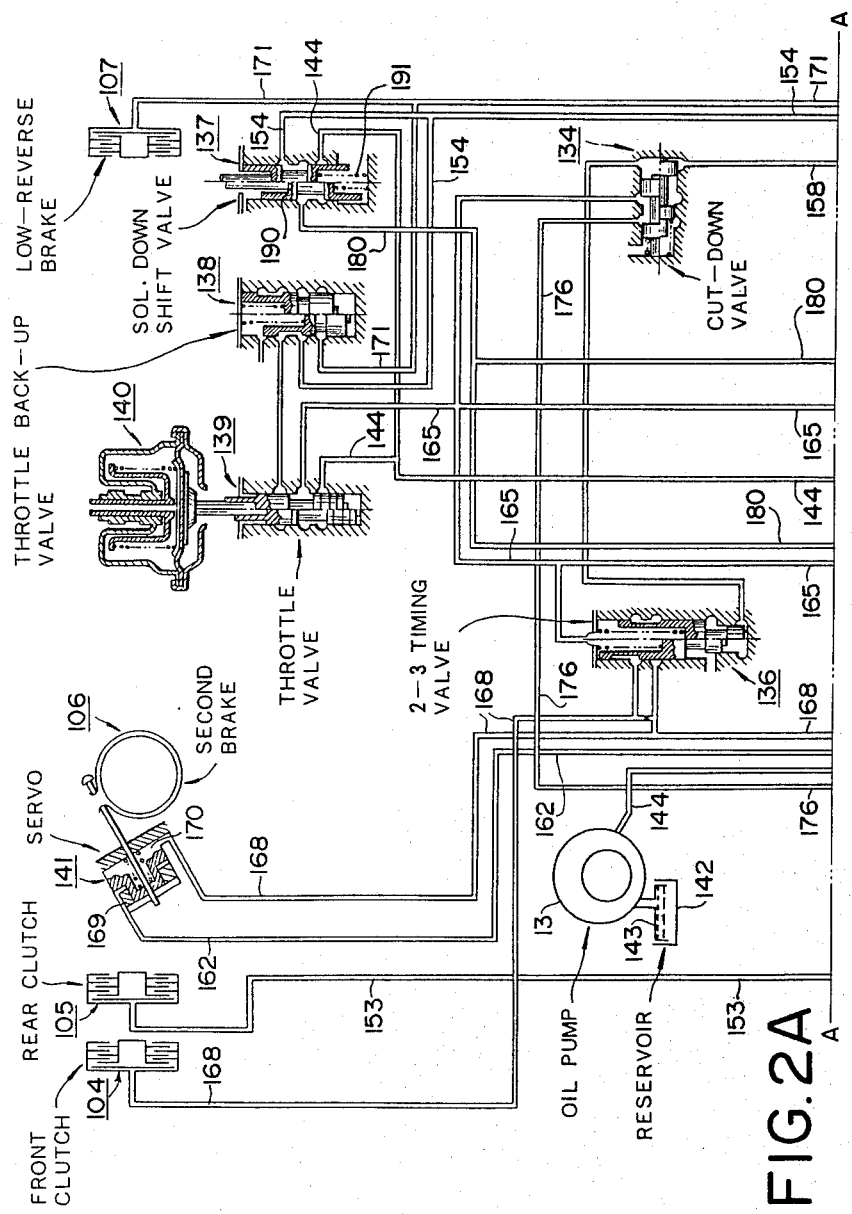

FIGS. 2A and 2B show a hydraulic control system of for the above-described change speed transmission. The control system comprises an oil pump 13, a line pressure regulator valve 128, a pressure booster valve 129, a torque converter 1, a speed selector valve 130, a first governor valve 113, a second governor valve 114, a 1-2 shift valve 131, a 2-3 shift valve 132, a throttle pressure reducing valve 133, a cut-down valve 134, a second lock valve 135, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prime mover through the driving shaft 14 and the pump impeller P of the torque converter 1 for drawing oil from a reservoir 142 through a strainer 143, where harmful dust is removed, during all operating conditions of the prime mover to send the oil to a line pressure circuit 144. The oil is regulated by the line pressure regulator valve 128 and the thus regulated oil is transmitted to the torque converter 1 and speed selector valve 130.

The hydraulic control system illustrated in FIGS. 2A and 2B is similar in construction to the hydraulic control system disclosed in U.S. Pat. No. 3,710,652, issued to T. Miyazaki, on Jan. 16, 1973, and reference may be made for a more complete description of the construction and operation of the transmission.

The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper areas of the spool 172.

The torque converter operating oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 147 toward the rear lubricating part of the power transmitting mechanism. When the lubricating oil pressure is too high, a relief valve 148 opens, resulting in a pressure drop. On the other hand, the lubricating oil is supplied from the circuit 145 through a front lubrication valve 149, as it is open, to the front lubricating part of the power transmitting mechanism. The speed selector valve 130 is a manually operable liquid direction switching valve and it comprises a spool 150, and is connected to a speed selector rod (not shown) through a linkage so that manipulating the speed selector rod into any desired one of the positions causes the spool 150 to change the passage of the line pressure circuit 144. FIG. 2B shows a condition of the speed selector valve when the spool takes up the N (neutral) position, wherein the line pressure circuit 144 is permitted to communicate with two ports d and e.

The first and second governor valves 113 and 114 are operable to produce a governor pressure while the automobile is moving forwardly. When the speed selector valve 130 assumes either of the D, II or I positions, the oil pressure is fed from the line pressure circuit 144 to the second governor valve 114 through the port c of the speed selector valve 130. If under this condition the automobile begins to move, the governor pressure regulated by the second governor valve 114 is supplied to a circuit 157 leading to the first governor valve 113. Subsequently when the vehicle speed reaches a predetermined value, the spool 177 of the first governor valve 113 moves to a position wherein the circuit 157 communicates with a circuit 158, supplying the latter with the governor pressure regulated by the second governor valve 114. The governor pressure is also supplied to the circuit 158, thus acting on the respective end surfaces of the 1-2 shift valve 131, 2-3 shift valve and cut-down valve 134 against the respective springs which urge these valves toward respective lower half positions illustrated in FIGS. 2A and 2B.

In the oil flow passageway leading from the port c of the speed selector valve 130 through a circuit 153, a circuit 161 and a circuit 162, up to an apply side oil pressure chamber 169, the 1-2 shift valve 131 and second lock valve 135 are separately arranged, and a circuit 152 leads from the port b of the speed selector valve 130 to the second lock valve 135.

If the speed selector lever 130 is moved to the D position, the spool 150 of the speed selector valve 130 is moved to a position providing communication between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down. The spool 178 is upwardly by a spring 179 and urged by the oil pressure transmitted thereto through the circuit 152 from the port b. while, The oil pressure at the port a is transmitted through an orifice 166 and a circuit 167 to the 2-3 shift valve 132. The oil pressure at the port c is transmitted through a circuit 153 to the second governor valve 114, rear clutch 105, and 1-2 shift valve 131, thereby establishing the first forward gear ratio condition of the transmission.

When, under this condition the vehicle speed increases up to a certain level, the governor pressure in the circuit 158 urges the spool 160 of the 1-2 shift valve 131, which is urged to the right by the spring 159, to move to the left, for effecting an upshift from the first forward gear ratio to the second forward gear ratio. As a result, the circuit 153 is permitted to communicate with the circuit 161 thereby allowing the oil pressure to be transmitted through the second lock valve 135 to the apply side oil pressure chamber 169 of the servo 141 through a circuit 162 to apply the second brake 106, thus establishing the second forward gear ratio condition.

Since the 1-2 shift valve 131 in this control system is minimized, the spool 160 is highly responsive to effect movement to the left with the necessary speed, so that the vehicle speed at which the upshift is made does not move toward a higher vehicle speed from the designed speed level.

When the vehicle speed further increases up to a another high predetermined level, the governor pressure in the circuit 158 urges the spool 164 of the 2-3 shift valve 132 to the left overcoming the spring 163. Thereupon the circuit 167 is permitted to communicate with the circuit 168 and oil pressure is directed through the circuit 168 to the release-side oil pressure chamber 170 of the servo 141 so as to release the second brake 106. Oil pressure is also directed to the front clutch 104 to engage the clutch 104, thus establishing the third forward gear ratio condition.

If the driver depresses the accelerator pedal to a position causing full opening of the throttle valve, during operation with the speed selector lever in the D position, an unillustrated kickdown switch is closed or rendered on to energize a downshift solenoid (not illustrated) for the solenoid downshift valve 137. This urges the spool 190 of the solenoid downshift valve 137 downwardly against a spring 191 from the locked position as illustrated in FIG. 2A. This movement of the spool 190 allows the kickdown circuit 180 to communicate with the line pressure circuit 144, thus allowing transmission of line pressure through the circuits 144 and 180 to the 1-2 shift valve 131 and the 2-3 shift valve 132 to act in opposed relationship with the governor pressure. If, under this condition, the vehicle is operating in the third gear ratio, the spool 164 of the 2-3 shift valve is forced to move against the governor pressure toward the right hand position as viewed in FIG. 2B by the above-mentioned line pressure, thus effecting a forced downshift from the third gear ratio to the second gear ratio when the vehicle speed falls in a predetermined range, thus providing a sufficient amount of acceleration force. If the above-mentioned kickdown is carried out during operation in the second gear ratio, since the governor pressure is relatively low, the spool 160 of the 1-2 shift valve 131 is forced to move rightwardly against the governor pressure from the left. This causes a forced downshift from the second gear ratio to the first gear ratio, thus providing a sufficient amount of acceleration force to meet the relatively heavy load.

If the speed selector lever is moved to the II position, the spool 150 of the speed selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162. This permits the oil pressure to reach the apply side oil pressure chamber 169 of the servo 141 so as to effect application of the second brake 106, thereby establishing the second forward gear ratio condition. The oil pressure at the port d is transmitted through the circuit 154 to the solenoid down shift valve 137 and throttle back-up valve 138. Since communication between the line pressure circuit 144 leading to the speed selector valve 130 and the port a thereof is prevented, the oil pressure does not get through the circuit 151 to the 2-2 shift valve 132. Thus neither release of the second brake 106 nor the application of the front clutch 104 will take place, so that an upshift to the third forward speed is prevented. As explained, the second lock valve 135 cooperates with the speed selector valve 130 to lock the transmission in the second forward speed. If the speed selector lever is moved to I position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear ratio condition. The oil pressure at the port e is applied to the left end of the 1-2 shift valve assembly 131, through the circuit 171, urging the spool 160 to the right in cooperation with the spring 159, thereby locking the transmission in the first forward speed once a downshift is made thereto.

In FIG. 2B, the reference numeral 100 denotes a lock-up control system which comprises a lock-up control valve 30 and a lock-up solenoid 31.

Figure 3A:
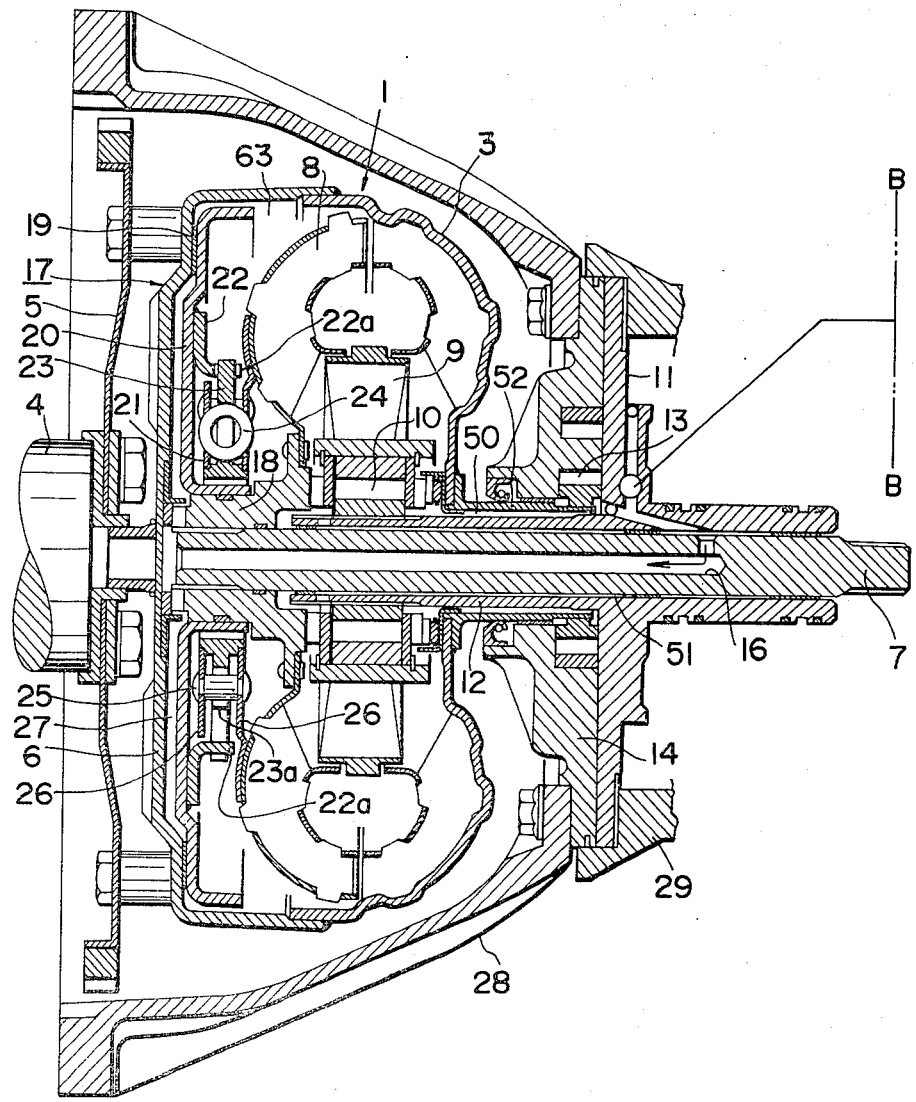
FIGS. 3A and 3B, when combined, provide a schematic sectional view showing the torque converter with a lock-up clutch, lock-up control valve and lock-up solenoid shown in FIG. 2B.
Figure 3B:
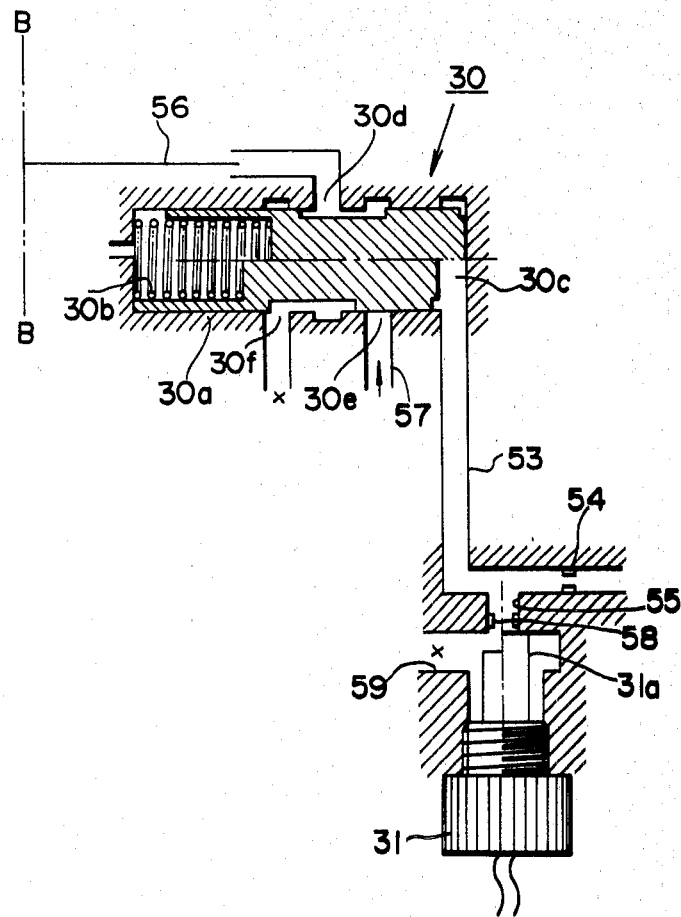

Referring to FIGS. 3A and 3B, the lock-up control valve 30, lock-up solenoid 31 and the torque converter 1 with a lock-up clutch 17 are specifically explained hereinafter.

The pump impeller 3 of the torque converter 1 is connected via a torque converter cover 6 with a drive plate 5. The drive plate is connected to the engine crankshaft 4. The turbine runner 8 is splined to the input shaft 7 with a hub 18. The stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within which the oil pump 13 is accommodated. The pump 13 is connected to the pump impeller 3 through a hollow shaft 52 driven by the engine. The hollow shaft 52 jackets therein the sleeve 12 to define an annular oil feed passage 50. The sleeve 12 allows the input shaft 7 to extend therethrough and cooperate to define therebetween an oil discharge passage 51. The sleeve 12 is formed integrally with the pump cover 11.

The lock-up clutch 17 has the following structure. A lock-up clutch piston 20 is fit around the hub 18 in an axially slidable manner, and this lock-up clutch piston is accommodated within the converter cover 6. The lock-up clutch piston 20 has an annular clutch facing 19 fixed to a surface thereof positioned opposite to the end wall of the torque converter cover 6, thereby providing an arrangement wherein when the clutch facing 19 contacts with end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and the like and comprises a drive plate 23, torsional springs 24, rivets 25 and driven plates 26. An annular member 22 is welded to the lock-up clutch piston 20 and has its claws 22a drivingly engaging in cutouts 23a formed through the drive plate 23, and the driven plate 26 is attached to the turbine runner 8. The lock-up chamber 27 communicates with a lock-up passage 16 formed through the input shaft 7. The lock-up passage 16 is operatively associated with said lock-up control system 100.

The lock-up control valve 30 is provided with a spool 30a which, when in the position illustrated by the upper half of spool 30a FIG. 3B, permits a port 30d to communicate with a port 30e and, when in the position illustrated by the lower half of the spool 30a of FIG. 3B, permits the port 30d to communicate with a drain port 30f. The port 30d communicates through a passage 56 with the lock-up passage 16. The port 30e communicates through a branch passage 57 with a torque converter operating oil feed passage 50 as shown in FIG. 2B. A chamber 30c communicates through a passage 53 with the rear clutch pressure passage 153 as shown in FIG. 2B.

An orifice 54 is provided in the passage 53 at an intermediate portion, and the passage 53 has a branch passage 55 from a location between this orifice and the chamber 30c. The branch passage 55 has therein an orifice 58 which communicates with a drain port 59. The solenoid valve 31 adapted to open and close the branch passage 55. For this purpose, the lock-up solenoid 31 has a plunger 31a which normally takes the position illustrated by left half position of plunger 31a in FIG. 2B or FIG. 3B. When the lock-up solenoid 31 is energized, the plunger 31a projects to assume the position illustrated by the right half portion of FIGS. 2B or 3B to close the branch passage 55.

When the lock-up solenoid 31 is not energized the branch passage 55, communicates with the drain port 59. Then, the rear clutch pressure in the passage 53 which is directed toward the chamber 30c, is discharged through the drain port 59 thus allowing the lock-up control valve 30 to establish communication between the port 30d and the port 30e. This is because the spool 30a is urged by a spring 30b to take the position illustrated by the upper half of the spool 30a in FIG. 3B. Therefore, a torque converter interior pressure reaching the passage 57 is supplied through the ports 30e, 30d, passage 56, passage 16 to the lock-up chamber 27, thus causing the pressure within the lock-up chamber 27 to have the same pressure value as that within the converter chamber 63. This causes the lock-up clutch piston 20 to move rightwardly from the position illustrated FIG. 3A to disengage the clutch facing 19 from the end wall of the converter cover 6, thus releasing the direct connection between the pump impeller 3 and the turbine runner 8, allowing the torque converter 1 to transmit power in the torque converter state.

When the lock-up solenoid 31 is energized to cause the plunger 31a to close the branch passage 55, the rear clutch pressure is supplied through the passage 53 to the chamber 30c, and the lock-up control valve 30 allows communication between the port 30d and the drain port 30f because the spool 30a is moved leftwardly from the position of spool 30a illustrated in the upper half of FIG. 3B to the position of spool 30a illustrated in the lower half of FIG. 3B. This causes the lock-up chamber 27 to communicate through the lock-up passage 16, passage 56, port 30d with a drain port 30f, causing the pressure therein to go to zero. Then, the lock-up clutch piston 20 is moved leftwardly as viewed in FIG. 3A by means of the torque converter interior pressure into contact with the end wall of the torque converter cover 6, thus establishing a lock-up state wherein the pump impeller 3 is connected directly to the turbine runner 8.

Figure 4:
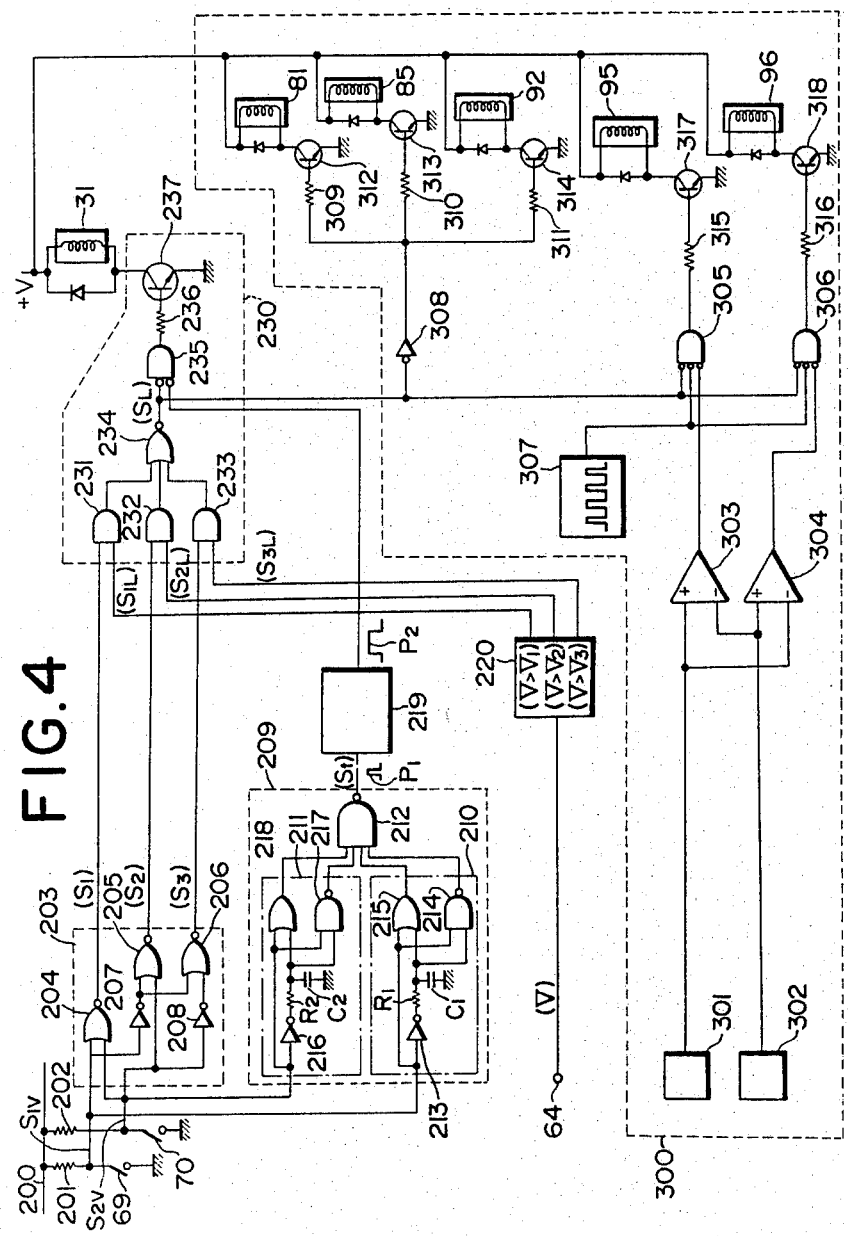
FIG. 4 is a block diagram of a control system according to the present invention associated with a lock-up control system of the lock-up type automatic transmission.

On and off of the above-mentioned lock-up solenoid 31 is controlled by an electronic circuit as shown in FIG. 4.

Referring to FIG. 4, a vehicle sensor 64, a 1-2 shift switch 69, and a 2-3 shift switch 70 are provided which generate signals on which the lock-up solenoid 31 selectively energized. Designated by 300 is a control system according to the present invention, which is described later.

Figure 5A:
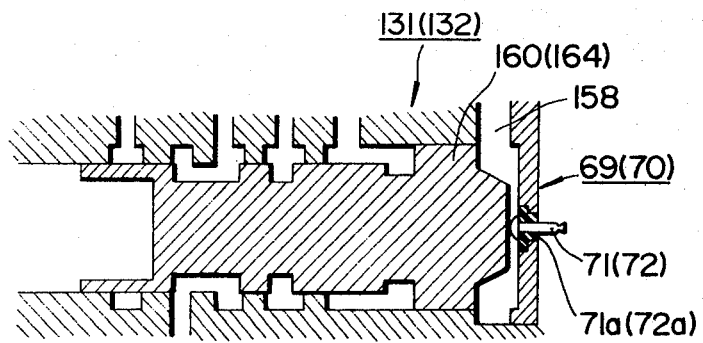
FIG. 5A is a cross sectional view of a shift valve illustrating an example of a shift switch.
Figure 5B:
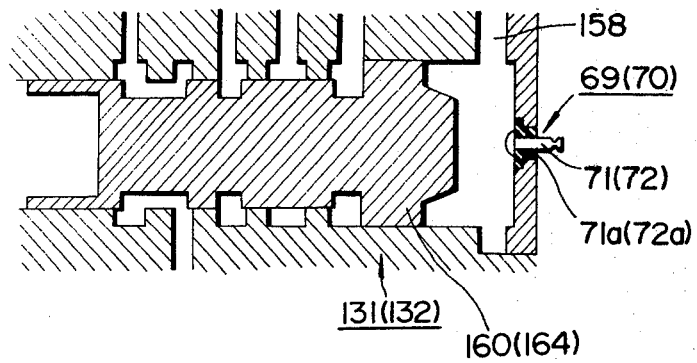
FIG. 5B is a similar view of FIG. 5A but indicating a different operating condition.

As shown in FIGS. 5A and 5B, the 1-2 shift switch 69 and 2-3 shift switch 70 are assembled with the shift valves 131 and 132, respectively, such that the switches are opened or closed in response to movement of the spool 160 of the 1-2 shift valve 131 (ref. FIG. 2B) and that of the spool 160 of the 2-3 shift valve 132 (ref. FIG. 2B). For this purpose, the spools 160 and 164 are used as movable contacts, and stationary contacts 71 and 72 are mounted via respective electrically insulated materials 71a and 72a in positions opposite to the right hand ends, viewing in the Figure, of the respective spools, whereby the spool 160 and stationary contact 71 cooperate to form the 1-2 shift switch 69 and the spool 164 and stationary contact 72 cooperate to form the 2-3 shift switch 70.

During operation of the vehicle with the automatic transmission in D range, the spool 160 of the 1-2 shift valve 131 and the spool 164 of the 2-3 shift valve 132 assume positions as illustrated in FIG. 5A contacting the stationary contacts 71 and 72, thus closing the shift switches 69 and 70 when the first gear ratio is selected. The closing of the shift switches 69 and 70 causes the power supply 200 to be grounded through the resistors 201 and 202, thus rendering shift valve signals $S_{1v}$ and $S_{2v}$ to take L (or low) levels, respectively. When the second gear ratio is selected, the spool 160 of the 1-2 shift valve 131 assumes the position as illustrated in FIG. 5B after moving away to disengage from the stationary contact 71 to render the 1-2 shift switch 69 open, while, the 2-3 shift switch 70 remains in its closed state because the 2-3 shift valve 132 remains in the state as illustrated in FIG. 5A. This causes the shift switch 69 to change the shift valve signal $S_{1v}$ to a H (or high) level and the shift switch 70 to maintain the shift valve signal $S_{2v}$ at a L level. When the third gear ratio is selected, both of the spool 160 of the 1-2 shift valve 131 and the spool 164 of the 2-3 shift valve 132 take the position illustrated in FIG. 5B after moving away to disengage from the stationary contacts 71 and 72, rendering both of the shift switches 69 and 70 open. This causes the shift switches 69 and 70 to change the shift valve signals $S_{1v}$ and $S_{2v}$ to H levels, respectively.

Referring again to FIG. 4, the numeral 203 designates a gear ratio decision circuit to which the above-mentioned shift valve signals $S_{1v}$ and $S_{2v}$ are fed and which is in the form of a logic circuit comprising NOR gates 204, 205 and 206 and NOT gates 207 and 208. Upon selection of the first gear ratio, when the shift valve signals $S_{1v}$ and $S_{2v}$ take L levels, only an output $S_1$ (first gear ratio signal) of the NOR gate 204 takes a H level; upon selection of the second gear ratio when only the shift valve signal $S_{1v}$ takes a H level, only an output $S_2$ (second gear ratio signal) of the NOR gate 205 takes a H level; and upon selection of third gear ratio when the shift valve signal $S_{2v}$ also takes a H level, only an output $S_3$ (third gear ratio signal) takes a H level.

The shift valve signals $S_{1v}$ and $S_{2v}$ are fed also to a gear shifting decision circuit 209. The gear shifting decision circuit 209 comprises an edge trigger circuit 210 to detect a rise and a fall in the shift valve signal $S_{1v}$ and an edge trigger circuit 211 to detect a rise and a fall in the shift valve signal $S_{2v}$, and a NAND gate 212. The edge trigger circuit 210 comprises a NOT gate 213, a resistor $R_1$ and a capacitor or condensor $C_1$ which form a delay circuit, a NAND gate 214 for a rise detection, and an OR gate 215 for a fall detection. Similarly, the edge trigger circuit 211 comprises a NOT gate 216, a delay circuit having a resistor $R_2$ and a capacitor or condensor $C_2$, a NAND gate 217, and an OR gate 218. When the corresponding shift valve signals $S_{1v}$ and $S_{2v}$ change from a L level to a H level or from a H level to a L level, viz., upon occurrence of gear shifting, the edge trigger circuits 210 and 211 feed a negative polarity pulse signal (the duration or width of the pulse is determined by the above-mentioned delay circuit) to the corresponding input terminal of a NAND gate 212. Then, the NAND gate 212 produce a positive polarity trigger pulse (designated by $P_1$) which is obtained after inversing the polarity of said pulse signal fed thereto, this pulse being fed to a timer 219 as a gear shifting signal $S_t$. The timer 219 is designed such that, when the gear shifting signal $S_t$ is fed, the pulse width of it can be adjustably varied and thus a signal $P_2$ having a pulse width which can be adjusted as desired is produced.

The vehicle speed sensor 64 feeds a vehicle speed signal V that indicates vehicle speed to a vehicle speed comparator circuit 220 which vehicle speed comparator circuit 220 compares the fed vehicle speed signal $V_1$ with a lock-up vehicle speed $V_1$ for the first gear ratio, a lock-up vehicle speed $V_2$ for the second gear ratio and a lock-up vehicle speed $V_3$ for the third gear ratio. The vehicle speed comparator circuit 220. The vehicle comparator circuit 220 shifts a lock-up permission signal $S_{1L}$ to an input of AND gate 231 to a H level when the vehicle speed signal exceeds the lock-up vehicle speed $V_1$ comparator 220 also shifts also a lock-up permission signal $S_{2L}$ to an input of AND gate 232 to a H level when the vehicle speed signal V exceeds and thus is the lock-up vehicle speed $V_2$, and also shifts a lock-up permission signal $S_{3L}$ to an input of AND gate 233 to a H level when the vehicle speed exceeds the lock-up vehicle speed $V_3$.

Figure 10:
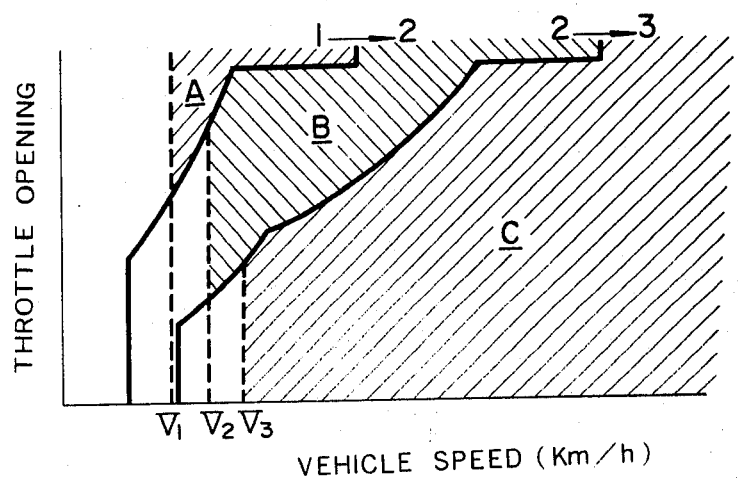
FIG. 10 is a shift pattern diagram showing lock-up ranges.

Designated by 230 is an actuating circuit for said lock-up solenoid 31 which circuit comprises the three AND gates 231 to 233, a NOR gate 234, a NAND gate 235, a bias resistor 236 and a Darlington transistor 237. The AND gates 231 to 233 each having one input terminal fed with the corresponding one of said gear ratio signals $S_1$ to $S_3$ and the other input terminal thereof fed with the corresponding one of said lock-up signals $S_{L1}$, $S_{L2}$ and $S_{L3}$. The AND gate 231 produces a H level signal when the gear ratio signal $S_1$ takes a H level indicating the transmission is the first gear ratio and when the lock-up signal $S_{L1}$ takes a H level indicating the vehicle speed is higher than the lock-up vehicle speed $V_1$, that is, during operation within a range A as illustrated in FIG. 10. The AND gate 232 produces a H level signal when both the gear ratio signal $S_2$ and a lock-up signal $S_{L2}$ are at an H level, that is, during operation within a range B illustrated in FIG. 10. In a similar manner, the AND gate 233 produces a H level signal when both the gear ratio signal $S_3$ and a lock-up signal $S_{L3}$ are at an H level, that is, during operation within a range C as illustrated in FIG. 10. Upon appearance of a H level signal from any one of the AND gates 231 to 233, the NOR gate 234 produce a L level signal $S_L$. This L level signal is fed to one input terminal of a NAND gate 235 as an actuating signal. The NAND gate 235 applies a H level signal, whenever no pulse signal $P_2$ is fed to its other input terminal, that is, viz., when no gear shifting is being carried out, to the base of the transistor 237 through a resistor 236, thus rendering transistor 237 conductive to actuate the lock-up solenoid 31 by means of the power supply +V.

Accordingly, during operation within lock-up ranges A or B or C as illustrated in FIG. 10 and when no gear shifting is being carried out, the lock-up solenoid 31 is energized to effect a lock-up as hereinafter described. However, when gear shifting is being carried out, thus producing a gear shifting signal $S_t$ (pulse signal $P_1$), the pulse signal $P_2$ produced by the timer 219 is produced (for the duration of time corresponding to the pulse width of the pulse signal $P_2$) to apply an H level signal to the NAND gate 235, thereby deenergizing the lock-up solenoid 31 even during operation within any one of the lock-up ranges, thus preventing the occurrence of gear shift shock.

The control system for an engine of an automotive vehicle equipped with the lock-up type automatic transmission, constructed as described above, has the following structure.

Figure 6:
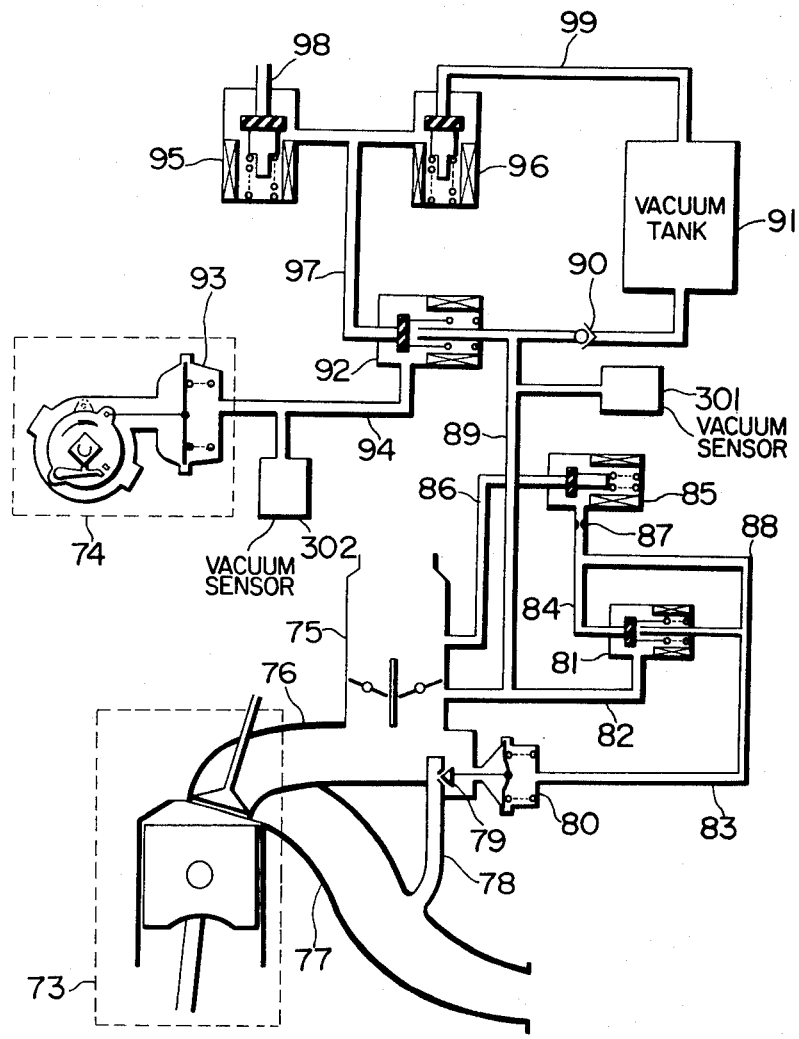
FIG. 6 is a diagram showing a valve arrangement for an engine control system according to the present invention.

Referring to the control system shown in FIG. 6, the engine is designated by 73 and a vacuum advance type distributor is designated by 74. The engine 73 draws thereinto a mixture of air and fuel from a carburetor 75 through an intake manifold 76, combusts it to obtain output power, and discharges the combustion gas through an exhaust manifold 77. A portion of the combustion gas within the exhaust manifold 77 is returned back to the intake manifold 76 through an exhaust recirculation conduit 78 wherein the amount of exhaust recirculation is controlled by an EGR (exhaust gas recirculation) valve 79 and an EGR diaphragm device 80 for actuating the EGR valve 79.

A three-way electromagnetic valve 81 normally, viz., upon deenergization of a solenoid thereof, allows a manifold vacuum passage 82 communicating with the intake manifold to communicate with an EGR vacuum passage 83 coming from the diaphragm device 80, and allows the manifold vacuum passage 82 to communicate with a dilution passage 84 upon energization of the solenoid thereof. Atmospheric air admission valve 85 allows the dilution passage 84 to communicate with an atmosphere passage 86 for controllably admitting the atmospheric air into the dilution passage 84 via an orifice 87.

A branch vacuum passage 89 from the manifold vacuum passage 82 connects with a vacuum tank 91 via a one-way check valve 90, thus storing the vacuum occurring within the intake manifold 76 into this tank. A second three-way electromagnetic valve 92 normally, viz., upon deenergization of a solenoid thereof, allows a spark advance vacuum passage 94 coming from a spark advance diaphragm device 93 to actuate a vacuum advance unit of the disstributor 74 to communicate with the branch vacuum passage 89, and allows the passage 94 to communicate with a bifurcated passage 97 leading to an atmosphere solenoid valve 95 and a vacuum solenoid valve 96. The atmosphere solenoid valve 95 normally, viz., upon deenergization of a solenoid thereof, closes the atmospheric air admission passage 98, and opens this passage upon energization of the solenoid thereof to supply the atmospheric air to the bifurcated passage 97. The vacuum solenoid valve 96 normally, viz., upon deenergization of a solenoid thereof, closes a vacuum tank passage 99 from the vacuum tank 91, and opens this passage 99 upon energization of the solenoid thereof to supply the vacuum to the bifurcated passage 97.

Reference numerals 301 and 302 designate a manifold vacuum sensor and a spark advance vacuum sensor respectively, and are respectively provided in the passage 89 and the passage 94 for detecting manifold vacuum occurring within the intake manifold 76 and spark advance vacuum occurring within the diaphragm 93 respectively to generate electric voltage signals indicative of these vacuums.

The electronic control circuit of the system according to the present invention, which circuit is generally designated by the reference numeral 300 in FIG. 4, is now explained. In the circuit 300, the output of the manifold vacuum sensor 301 is fed to a plus input terminal of a comparator 303 and a minus input terminal of a comparator 304, and the output of the spark advance vacuum sensor 302 is fed to the respective other input terminals of the comparators 303 and 304, respectively. The outputs of the comparators 303 and 304 are each fed to one of three-inputs of NAND gates 305 and 306. Another input terminal of each NAND gates 305 and 306 is supplied with a signal from a multivibrator 307 that generates a predetermined pulsating signal. The other input of each of the NAND gates 305 and 306 is supplied with the lock-up signal $S_L$. The lock-up signal $S_L$ is also fed to a NOT gate 308 which feeds its inverted output through bias resistors 309, 310 and 311 to bases of Darlington transistors 312, 313 which in turn energize 314, and the solenoids of the valves 81, 85 and 92 through the electric power terminal +V through collector-emitter circuits of these transistors. The outputs of the NAND gates 305 and 306 are fed through bias resistors 315 and 316 to bases of Darlington transistors 317 which in turn energize 318, and the solenoids of the valves 95 and 96 through the electric power terminal +V through collector-emitter circuits of these transistors.

The operation of the system according to the present invention is subsequently explained.

When the automatic transmission operates in a torque converter state, the lock-up signal $S_L$ takes a H level as described before. Since the lock-up signal $S_L$ having a H level is inverted by the NOT gate 308 into a signal having a L level, the transistors 312 to 314 are all rendered off, thus leaving the solenoids of the valves 81, 85 and 92 deenergized. Lock up signal having a H level are fed also to the NAND gates 305 and 306, but since these NAND gates do not generate a H level signal until all of their input terminals receive L level signals, the NAND gates 305 and 306 generate L level signals, rendering the transistors 317 and 318 off, thus leaving the solenoid of the valves 95 and 96 deenergized.

Under the deenergized conditions, the valves 81, 85, 92, 95 and 96 take states as shown in FIG. 6, and the exhaust gas recirculation control and ignition timing control are carried out as follows:

Explaining firstly the exhaust gas recirculation control in connection with FIG. 6, the three-way valve 81 allows the manifold vacuum passage 82 to communicate with the EGR vacuum passage 83. Since the atmosphere valve 85 prevents communication between the passage 84 and passage 86, the manifold vacuum within the intake manifold 76 is directly admitted into the diaphragm device 80 through the passages 82 and 83, thus increasing the degree of opening of the valve 79, resulting in an increased amount of exhaust gas recirculation which is suitable for operation of the engine when the torque converter operates in the torque converter state.

Turning now to ignition timing control, the second three-way valve 92 allows the spark advance vacuum passage 94 to communicate with the branch vacuum passage 89. Since the atmosphere valve 95 and vacuum valve 96 are closed, the manifold vacuum within the intake manifold 76 is directly admitted into the spark advance diaphragm device 93 through the passages 82, 89 and 94, thus causing the spark advance diaphragm device 93 to actuate the distributor 74 in an advance direction to a greater degree, thus allowing spark advance control in accordance with an advance characteristic as shown by curve a in FIG. 7, which is suitable for operation of the engine when the torque converter operates in the torque converter state that provides a relatively large advance similar to that used for the commonly used automatic transmission.

When the operation of the automatic transmission is shifted into a lock-up state, the lock-up signal $S_L$ takes an L level as described above. This L level $S_L$ signal is inverted by the NOT gate 308 to output an H level signal to render the Darlington transistors 312, 313 and 314 on, thus energizing the solenoids of the valves 81, 85 and 92. The energization of the three-way valve 81 causes the manifold vacuum passage 82 to communicate with the dilution passage 84, and the energization of the atmospheric air admission valve 85 causes the dilution passage 84 to communicate with the atmosphere passage 86. This causes the dilution of the manifold vacuum that has reached the passage 84 through the passage 82 with atmospheric air that is controllably admitted through the passage 86 to the passage 84 via the orifice 87. Thus, a corrected (renduced in pressure) vacuum is created in the passage 84 and this pressure is supplied to the EGR diaphragm device 80 through the bypass passage 88 and the passage 83. Accordingly, the EGR diaphragm device 80 is actuated by a reduced in pressure vacuum, the magnitude of which is determined by the amount of atmospheric air admitted through the orifice 87. Therefore, the degree of opening of the exhaust gas recirculation valve 79 (EGR valve) is decreased during operation of the engine when the torque-converter operates in the lock-up state as compared to the degree of opening during operation of the engine when the torque-converter operates in the torque converter state where the diaphragm is actuated directly by the manifold vacuum, thus resulting in a smaller amount of exhaust gas recirculation as required.

The energization, as described above, of the three-way valve 92 prevents the spark advance vacuum passage 94 from communicating with the branch vacuum passage 89 but does allow the passage 94 to communicate with the bifurcated passage 97. Thus, advance control is not effective based on the manifold vacuum, as is the case during the operation of the engine when the torque converter operates in the torque converter state, but on the vacuum that is created in the manner described below within the bifurcated passage 97 during operation of the engine when the torque converter operates in the lock-up state.

Figure 7:
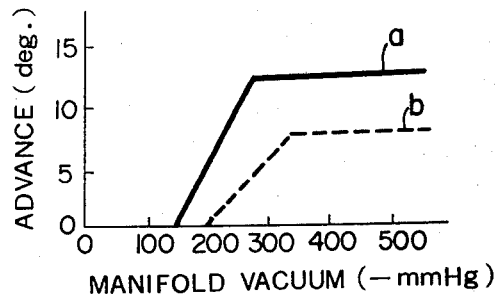
FIG. 7 is a graph showing spark advance vs. manifold vacuum characteristic curves.

The lock-up signal $S_L$, which takes a L level during operation of the engine when the torque converter operates in the lock-up state, is fed also to NAND gates 305 and 306. The NAND gates 305 and 306 generate a H level signal when the signal from the multivibrator 307 and signals from the comparators 303 and 304 have L levels. The H level signals from the NAND gates 305 and 306 operate to energize the solenoids of the atmosphere valve 95 and the vacuum valve 96. Since an advance characteristic similar to that shown by a broken line curve b in FIG. 7 is required during operation of the engine when the torque converter operates in the lock-up state, the output characteristic of the manifold vacuum sensor 301 should be set as shown by a solid line curve $V_5$ in FIG. 8 which varies in the same manner as the advance characteristics curve b. The output, viz., electric voltage $V_5$, from the manifold vacuum sensor 301 and the output, viz., electric voltage $V_4$, from the spark advance vacuum sensor 302 that varies as shown in FIG. 9 are compared by the comparators 303 and 304.

The comparator 303 feeds a L level signal to the NAND gate 305 only when the output $V_4$ from the advance vacuum sensor 302 exceeds output $V_5$ from the manifold vacuum snesor 301. Thus, NAND gate 305 feeds a H level signal whenever the pulse signal from the multivibrator 307 takes a L level so as to periodically energize the atmosphere solenoid 95. Therefore, the atmosphere solenoid 95 repeats an on-off cycle in response to the pulse signal from the multivibrator 307 as long as the output voltage $V_4$ generated by the advance vacuum sensor 302 is greater than the output voltage $V_5$ generated by the manifold vacuum sensor 301, thus allowing the admission of atmospheric air from the passage 98 into the passage 97 to decrease the advance vacuum.

The comparator 304, an L level signal to the NAND gate 306 only when the output voltage $V_4$ from the advance vacuum sensor 302 falls below the output voltage $V_5$ from the manifold vacuum sensor 301. Thus NAND gate 306 generates an H level signal whenever the pulse signal from the multivibrator 306 takes an L level, thus periodically energizing the solenoid of the vacuum valve 96. Therefore, the solenoid of the vacuum valve 96 repeats an on-off cycle in reponse to the pulse signal from the multivibrator 307 as long as the output voltage $V_4$ generated by the advance vacuum sensor 302 is smaller than the output voltage $V_5$ generated by the manifold vacuum sensor 301. This allows the admission of a vacuum from the vacuum tank 91 into the bifurcated passage 97 through the vacuum tank passage 99, thus causing an increase in the advance vacuum.

Figure 8:
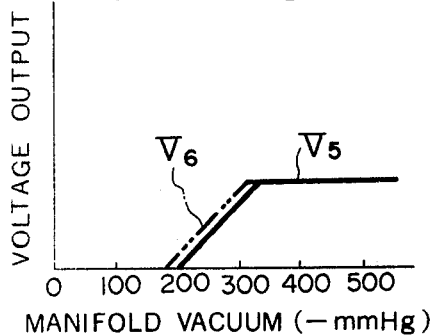
FIG. 8 is a graph showing voltage output (sensor output) vs. manifold vacuum curves provided by a manifold vacuum sensor.
Figure 9:
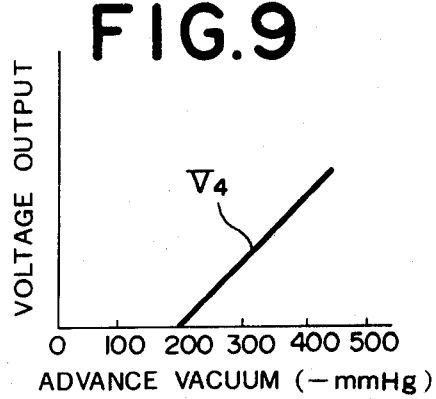
FIG. 9 is a graph showing a voltage output (sensor output) vs. advance vacuum curve provided by a spark advance vacuum sensor.

Repeating the above mentioned operation allows the advance vacuum admitted into the diaphragm device 93 to vary as shown by the solid line curve $V_5$ in FIG. 8 which varies in a similar manner to the advance characterstic shown by the broken line curve b of FIG. 7 as required during operation of the engine when the torque converter operates in the lock-up state.

In the embodiment shown in FIG. 4, the spark advance vacuum sensor 301 senses the amount of spark advance through detection of spark advance vacuum within the spark advance vacuum passage 94 and generates electric signal $V_4$ that indicates the spark advance vacuum. This electric signal $V_4$ is fed to both comparators 303 and 304. The manifold vacuum sensor 301, on the other hand, senses intake manifold vaccum within the branch vacuum passage 89 and generates the electric voltage $V_5$ which varies against the variation in the intake manifold vacuum in the same pattern as variation of the spark timing shown by broken line curve b in FIG. 7. This electric signal $V_5$ is fed to both comparators 303 and 304 as reference signals. The comparator 303 compares the spark advance vacuum indicative signal $V_4$ with the intake manifold vacuum indicative signal $V_5$ and generates an L level signal (control signal) only when the spark advance vacuum signal $V_4$ is greater than the intake manifold vacuum indicative signal $V_5$. This L level control signal causes the admission of atmospheric air into the spark advance vacuum passage 94 although in this state the other comparator 304 keeps on generating an H level signal. When the advance vacuum signal $V_4$ is smaller than the manifold vacuum indicative signal $V_5$, even though the comparator 303 changes its output to an H level, the comparator 304 changes its output level to a L level. The comparator 304 generates a L level only when the advance vacuum indicative signal $V_4$ is smaller than the intake manifold vacuum signal $V_5$ so as to cause the application of vacuum from the vacuum tank 91 to the spark advance vacuum passage 94. In this manner, the amount of spark advance is controlled so as to reduce a difference between the spark advance indicative signal $V_4$ and the manifold vacuum indicative signal $V_5$. Hence, the spark advance varies in the same pattern of variation as shown by the broken line curve b in FIG. 7.

Although, in the embodiment shown in FIG. 4, the intake maniold vacuum sensor 301 generates and feeds the intake manifold vacuum indicative signal $V_5$ to both comparators 303 and 304, if desired, the manifold vacuum sensor 301 may generate, in addition to the manifold vacuum indicative signal $V_5$, an electric voltage signal $V_6$ which varies in the same pattern as the pattern of variation of the intake manifold vacuum indicative signal $V_5$ but is slightly greater than the intake manifold vacuum indicative signal $V_5$ while the latter is increasing in proportion to an increase in the intake manifold vacuum.

In this case, the manifold vacuum indicative signal $V_5$ is fed to the minus input terminal of the comparator 304 and the another electric voltage signal $V_6$ is fed to the plus input terminal of the comparator 303. When the spark advance vacuum signal $V_4$ is smaller than the manifold vacuum indicative signal $V_5$, the comparator 303 generates a H level signal and the comparator 304 generates a L level signal (control signal). When the spark advance vacuum indicative signal $V_4$ is greater than the relatively high electric voltage signal $V_6$, the comparator 303 generates a L level signal (control signal) and the comparator 304 generates a H level signal. However, when the spark advance vacuum indicative signal $V_4$ is greater than the manifold vacuum indicative signal $V_5$ but smaller than the relatively high electric voltage signal $V_6$, both of the comparators 303 and 304 generate H level signals.

It will now be understood that the comparators 303 and 304 will not generate L level signals (control signals) when the spark advance vacuum indicative signal $V_4$ is within a zone defined by the manifold vacuum indicative signal $V_5$ and the relatively high signal $V_6$, thus preventing the air admission control and the vacuum admission control.

From the foregoing description, it will be appreciated that according to the present invention, the amount of exhaust gas recirculation is controlled to vary in a first pattern which provides suitable exhaust gas recirculation for operation of the engine when the lock-up torque converter operates in the torque converter state, and, is controlled in response to the presence of lock-up signal (L level signal) to vary in a second pattern which provides suitble exhaust gas recirculation of the engine when the lock-up torque converter operates in the lock-up state. The ignition timing (the amount of spark advance) is controlled to vary in a first pattern which provides suitable spark timing for operation of the engine when the torque converter operates in the torque converter state, and is controlled to vary in a second pattern in response to the presence of the lock-up signal (L level signal) which provides suitable ignition timing for operation of the engine when the torque converter operates in the lock-up state.

What is claimed is:

1. In an automotive vehicle having an engine:
    a lock-up type automatic transmission including a torque converter and a lock-up clutch, said lock-up type automatic transmission being shiftable between a plurality of gear ratios, said torque converter being shiftable into a lock-up state when said lock-up clutch is engaged and into a torque converter state when said lock-up clutch is disengaged;
    means for determining which of said plurality of gear ratios said lock-up type automatic transmission is operating in and for generating gear ratio signals indicative of the determined gear ratio;
    means for detecting a vehicle speed of the automotive vehicle and generating a vehicle speed indicative signal;
    means responsive to said vehicle speed indicative signal for generating a plurality of lock-up speed signals corresponding to said plurality of gear ratios;

means for generating a lock-up signal whenever a lock-up speed signal and a corresponding gear ratio determination signal are present;

means responsive to the presence of said lock-up signal for engaging said lock-up clutch thereby operating said lock-up torque converter in the lock-up state;

exhaust gas recirculation control means responsive to the absence of said lock-up signal for varying the amount of exhaust gas recirculation in a first pattern which provides suitable exhaust gas recirculation for operation of the engine when the lock-up torque converter operates in the torque converter state, and responsive to the presence of said lock-up signal for varying the amount of exhaust gas recirculation in a second pattern which provides suitable exhaust gas recirculation for operation of the engine when the lock-up torque converter operates in the lock-up state;

ignition timing control means responsive to the absence of said lock-up signal for varying a spark timing in a first pattern which provides suitable spark timing for operation of the engine when the torque converter operates in the torque converter state, and responsive to the presence of said lock-up signal for varying a spark timing in a second pattern which provides suitable spark timing for operation of the engine when the torque converter operates in the lock-up state.

2. A control system as claimed in claim 1, wherein the second pattern of the variation of said amount of exhaust gas recirculation provides a relatively small amount of exhaust gas recirculation as compared to that provided by the first pattern of the variation of said amount of exhaust gas recirculation.

3. A control system as claimed in claim 2, wherein the second pattern of variation of said spark timing provides a relatively small amount of spark advance as compared to that provided by the first pattern of variation of said spark timing.

4. A control system as claimed in claim 2, wherein said ignition timing control means comprises:
a distributor having a vacuum advance unit with a spark advance diaphragm device for actuating said vacuum advance unit;
a second three-way valve;
an atmosphere valve;
a vacuum valve;
a branch vacuum passage having one end opening into said manifold vacuum passage;
a spark advance vacuum passage having one end opening into said second three-way valve and another end opening into said spark advance diaphragm device;
a bifurcated passage having a first end opening into said three-way valve and a second end opening into said atmosphere valve and a third end opening into said vacuum valve, respectively;
a vacuum tank;
a vacuum tank passage having one end opening into said vacuum valve and another end opening into said vacuum tank;
said second three-way valve having a solenoid and valve means for normally establishing communication between said one end of said spark advance vacuum passage and said one end of said branch vacuum passage when said solenoid thereof is not energized and for establishing communication between said one end of said spark advance vacuum passage and said first end of said bifurcated passage when said solenoid thereof is energized;
said atmosphere valve having a solenoid and valve means for normally preventing communication between said second end of said bifurcated passage and atmosphere when said solenoid thereof is not energized and for establishing communication between said second end of said bifurcated passage and the atmosphere when said solenoid thereof is energized;
said vacuum valve having a solenoid and valve means for normally preventing communication between said third end of said bifurcated passage and said one end of said vacuum tank passage when said solenoid thereof is not energized and for establishing communication between said third end of said bifurcated passage and said one end of said vacuum tank passage when said solenoid thereof is energized;
means responsive to the presence of said lock-up signal for energizing said solenoid of said second three-way valve;
means for sensing spark advance vacuum within said spark advance vacuum passage and for generating a first electric signal that indicates the sensed spark advance vacuum;
means for sensing intake manifold vacuum within said branch vacuum passage and for generating a second electric signal that varies against the variation in the intake manifold vacuum in said second pattern of variation of said spark timing;
means for comparing said first electric signal with said second electric signal, said means being responsive to the presence of said lock-up signal for periodically energizing said solenoid of said atmosphere valve only when said first electric signal is greater than said second electric signal so as to admit atmospheric air into said spark advance vacuum passage via said bifurcated passage and via said second three-way valve or for periodically energizing said solenoid of said vacuum valve only when said first electric signal is smaller than said second electric signal so as to apply vacuum from said vacuum tank to said spark advance vacuum passage, to thereby reduce any difference between said first electric signal and said second electric signal.

5. A control system as claimed in claim 2, wherein said ignition timing control means comprises:
a distributor having a vacuum advance unit with a spark advance diaphragm device for actuating said vacuum advance unit;
a second three-way valve;
an atmosphere valve;
a vacuum valve;
a branch vacuum passage having one end opening into said second three-way valve and other end opening into said manifold vacuum passage;
a spark advance vacuum passage having one end opening into said second three-way valve and another end opening into said spark advance diaphragm device;
a bifurcated passage having a first end opening into said three-way valve and a second end opening into said atmosphere valve and a third end opening into said vacuum valve, respectively;

a vacuum tank;

a vacuum tank passage having one end opening into said vacuum valve and another end opening into said vacuum tank;

said second three-way valve having a solenoid and valve means for normally establishing communication between said one end of said spark advance vacuum passage and said one end of said branch vacuum passage when said solenoid thereof is not energized and for establishing communication between said one end of said spark advance vacuum passage and said first end of said bifurcated passage when said solenoid thereof is energized;

said atmosphere valve having a solenoid and valve means for normally preventing communication between said second end of said bifurcated passage and atmosphere when said solenoid thereof is not energized and for establishing communication between said second end of said bifurcated passage and the atmosphere when said solenoid thereof is energized;

said vacuum valve having a solenoid and valve means for normally preventing communication between said third end of said bifurcated passage and said one end of said vacuum tank passage when said solenoid thereof is not energized and for establishing communication between said third end of said bifurcated pssage and said one end of said vacuum tank passage when said solenoid thereof is energized;

means responsive to the presence of said lock-up signal for energizing said solenoid of said second three-way valve;

means for sensing spark advance vacuum within said spark advance vacuum passage and for generating a first electric signal that indicates the sensed spark advance vacuum;

means for sensing intake manifold vacuum within said branch vacuum passage and for generating a second electric signal that varies against the variation in the intake manifold vacuum in said second pattern of variation of said spark timing and for generating a third electric signal that varies substantially in the same manner as the variation of said second signal but slightly greater than said second signal;

first comparator means for comparing said first electric signal with said third electric signal, said means being responsive to the presence of said lock-up signal for periodically energizing said solenoid of said atmosphere valve only when said first electric signal is greater than said third electric signal so as to admit atmospheric air into said spark advance vacuum passage via said bifurcated passage and via said second three-way valve; and second comparator means for comparing said first electric signal with said second electric signal and responsive to the presence of said lock-up signal for periodically energizing said solenoid of said vacuum valve only when said first electric signal is smaller than said second electric signal so as to apply vacuum from said vacuum tank to said spark advance vacuum passage, whereby air or vacuum admission control ceases when the first electric signal is greater than said second electric signal and smaller than said third electric signal.

6. The automotive vehicle of claim 1, wherein said plurality of gear ratios comprises a first, second and third gear ratio and wherein said gear ratio signals comprise first, second and third gear ratio indicative signals and wherein said plurality of lock-up speed signals comprise first, second and third lock-up speed signals respectively corresponding to said first, second and third gear ratios.

7. The automotive vehicle of claim 6, wherein said means for generating a plurality of lock-up speed signals comprises a comparator for comparing said vehicle speed indicative signal with first, second and third lock-up speed reference levels and generating said first, second and third lock-up speed signals respectively whenever said vehicle speed indicative signal exceeds said first, second and third reference levels respectively, and said means for generating a lock-up signal comprises a logic means for generating said lock-up signal whenever one of said first, second and third lock-up speed signals is generated while a corresponding first, second or third gear ratio indicative signal is generated.

8. A control system for an engine of an automotive vehicle equipped with a lock-up type automatic transmission that includes a torque converter with a lock-up clutch, the torque converter being shiftable into either a lock-up state or a torque converter state, the control system comprising:

means for determining whether the automotive vehicle is operating in a predetermined lock-up range and for generating a lock-up signal that indicates that the automotive vehicle is operating within said predetermined lock-up range;

means responsive to the presence of said lock-up signal for operating said lock-up torque converter in the lock-up state;

exhaust gas recirculation control means responsive to the absence of said lock-up signal for varying the amount of exhaust gas recirculation in a first pattern which provides suitable exhaust gas recirculation for operation of the engine when the lock-up torque converter operates in the torque converter state, and responsive to the presence of said lock-up signal for varying the amount of gas recirculation in a second pattern which provides suitable exhaust gas recirculation for operation of the engine when the lock-up torque converter operates in the lock-up state;

ignition timing control means responsive to the absence of said lock-up signal for varying a spark timing in a first pattern which provides suitable spark timing for operation of the engine when the torque converter operates in the torque converter state, and responsive to the presence of said lock-up signal for varying a spark timing in a second pattern which provides suitable spark timing for operation of the engine when the torque converter operates in the lock-up state, said ignition timing control means comprising:

a distributor having a spark advance unit;

means for sensing the amount of spark advance provided by said spark advance unit and for generating a first signal indicative of said amount of spark advance;

means for sensing an operating parameter that indicates an operating condition of the engine and for generating a second signal that varies substantially in the second pattern of variation of said spark timing; and means for comparing said first signal with said second signal and for controlling said spark advance unit to reduce a difference between said first signal and said second signal.

9. A control system for an engine of an automotive vehicle equipped with a lock-up type automatic transmission that includes a torque converter with a lock-up clutch, the torque converter being shiftable into either a lock-up state or a torque converter state, the control system comprising:

means for determining whether the automotive vehicle is operating in a predetermined lock-up range and for generating a lock-up signal that indicates that the automotive vehicle is operating within said predetermined lock-up range;

means responsive to the presence of said lock-up signal for operating said lock-up torque converter in the lock-up state;

exhaust gas recirculation control means responsive to the absence of said lock-up signal for varying the amount of exhaust gas recirculation in a first pattern which provides suitable exhaust gas recirculation for operation of the engine when the lock-up torque converter operates in the torque converter state, and responsive to the presence of said lock-up signal for varying the amount of exhaust gas recirculation in a second pattern which provides suitable exhaust gas recirculation for operation of the engine when the lock-up torque converter operates in the lock-up state;

ignition timing control means responsive to the absence of said lock-up signal for varying a spark timing in a first pattern which provides suitable spark timing for operation of the engine when the torque converter operates in the torque converter state, and responsive to the presence of said lock-up signal for varying a spark timing in a second pattern which provides suitable spark timing for operation of the engine when the torque converter operates in the lock-up state, said ignition timing control means comprising:

a distributor having a spark advance unit;

means for sensing the amount of spark advance provided by said spark advance unit and for generating a first signal indicative of said amount of spark advance;

means for sensing an operating parameter that indicates an operating condition of the engine and for generating a second signal that varies substantially in the second pattern of variation of said spark timing and a third signal that varies substantially in the same manner as said second signal and of slightly greater magnitude than said second signal in at least one region thereof;

first comparator means for comparing said first signal with said third signal, said first comparator being responsive to the presence of said lock-up signal for causing said spark advance unit to decrease the amount of spark advance only when said first signal is greater than said third signal; and second comparator means for comparing said first signal with said second signal and responsive to the presence of said lock-up signal for causing said spark advance unit to increase the amount of spark advance only when said first signal is smaller than said second signal, whereby the increase or decrease control of said spark advance unit ceases when said first signal is greater than said second signal and smaller than said third signal.

10. A control system for an engine of an automotive vehicle equipped with a lock-up type automatic transmission that includes a torque converter with a lock-up clutch, the torque converter being shiftable into either a lock-up state or a torque converter state, the control system comprising:

means for determining whether the automotive vehicle is operating in a predetermined lock-up range and for generating a lock-up signal that indicates that the automotive vehicle is operating within said predetermined lock-up range;

means responsive to the presence of said lock-up signal for operating said lock-up torque converter in the lock-up state;

exhaust gas recirculation control means responsive to the absence of said lock-up signal for varying the amount of exhaust gas recirculation in a first pattern which provides suitable exhaust gas recirculation for operating of the engine when the lock-up torque converter operates in the torque converter state, and responsive to the presence of said lock-up signal for varying the amount of exhaust gas recirculation in a second pattern which provides suitable exhaust gas recirculation for operation of the engine when the lock-up torque converter operates in the lock-up state;

ignition timing control means responsive to the absence of said lock-up signal for varying a spark timing in a first pattern which provides suitable spark timing for operation of the engine when the torque converter operates in the torque converter state, and responsive to the presence of said lock-up signal for varying a spark timing in a second pattern which provides suitable spark timing for operation of the engine when the torque converter operates in the lock-up state;

said exhaust gas recirculation control means comprising:

an exhaust gas recirculation conduit having an EGR valve for controlling flow of exhaust gas through said exhaust gas recirculation conduit;

an EGR diaphragm device for actuating said EGR valve for controlling the opening of said EGR valve;

a three-way valve;

an atmospheric air admission valve, an EGR vacuum passage having one end opening into said three-way valve and another end opening into said EGR diaphragm device;

a manifold vacuum passage having one end opening into said three-way valve and another end opening into a carburetor for the engine at a position where intake manifold vacuum builds up;

a dilution passage having one end opening into said three-way valve and another end opening into said atmospheric air admission valve;

an atmosphere passage having one end opening into said atmospheric air admission valve and another end opening to the atmosphere;

a bypass passage having one end opening into said EGR vacuum passage and another end opening into said dilution passage;

said three-way valve having a solenoid and valve means for normally establishing communication between said one end of said EGR vacuum passage and said one end of said manifold vacuum passage when said solenoid thereof is not energized and for establishing communication between said one end of said EGR vacuum passage and said one end of said dilution passage when said solenoid thereof is energized;

said atmospheric air admission valve having a solenoid and valve means for preventing communication between said another end of said dilution passage and said another end of said atmosphere passage when said solenoid thereof is not energized and for establishing communication between said another end of said dilution passage and said one end of said atmosphere passage when said solenoid thereof is energized; and means responsive to the presence of said lock-up signal for energizing said solenoid of said three-way valve and periodically energizing said solenoid of said atmospheric air admission valve.

* * * * *

UNITED STATES PATENT AND TRADEMARK OFFICE
CERTIFICATE OF CORRECTION

PATENT NO. : 4,467,673

DATED : August 28, 1984

INVENTOR(S) : Hideo HAMADA et al

It is certified that error appears in the above-identified patent and that said Letters Patent is hereby corrected as shown below:

On the title page of the patent under item 30, the application number of the foreign priority document should read:
-- 55-72672 --.

Signed and Sealed this

Second Day of April 1985

[SEAL]

Attest:

DONALD J. QUIGG

Attesting Officer

Acting Commissioner of Patents and Trademarks